Oct. 18, 1932.                H. F. VICKERS                 1,883,166
                               MACHINE TOOL
                          Filed May 19, 1930        2 Sheets-Sheet 1
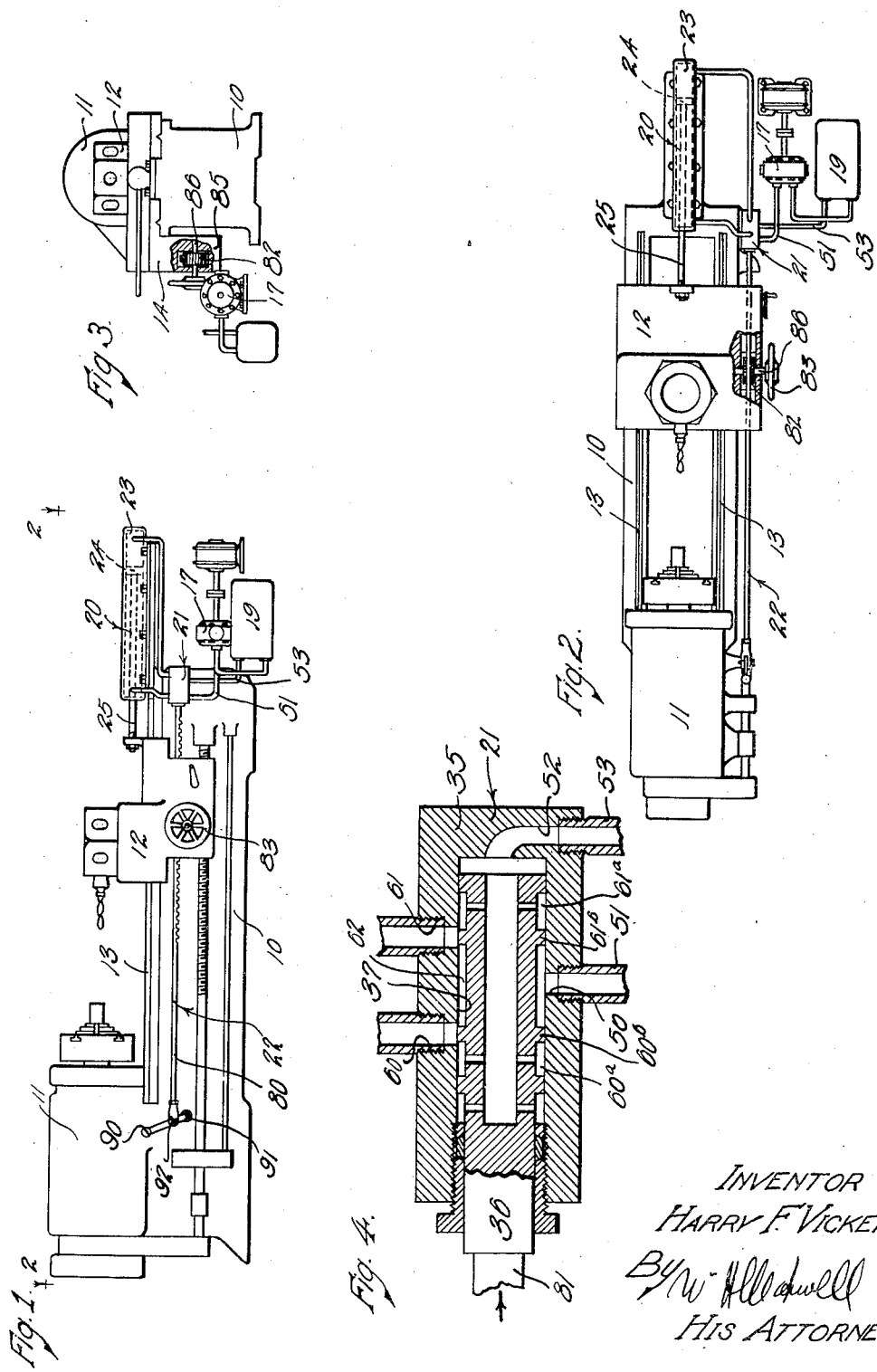
INVENTOR
HARRY F. VICKERS
BY W. Caldwell
HIS ATTORNEY Oct. 18, 1932.   H. F. VICKERS   1,883,166
MACHINE TOOL
Filed May 19, 1930    2 Sheets-Sheet 2
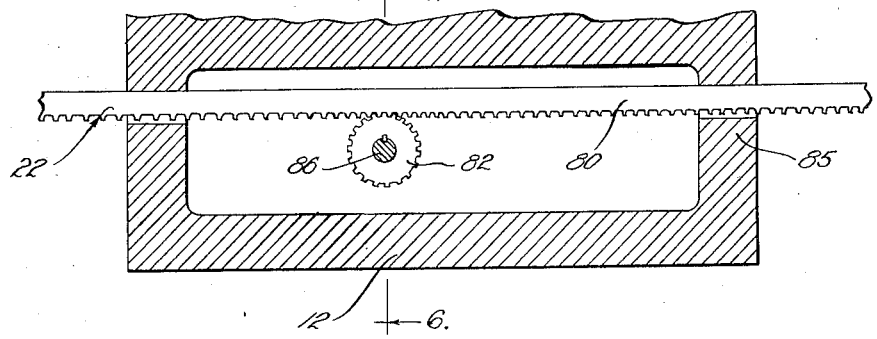
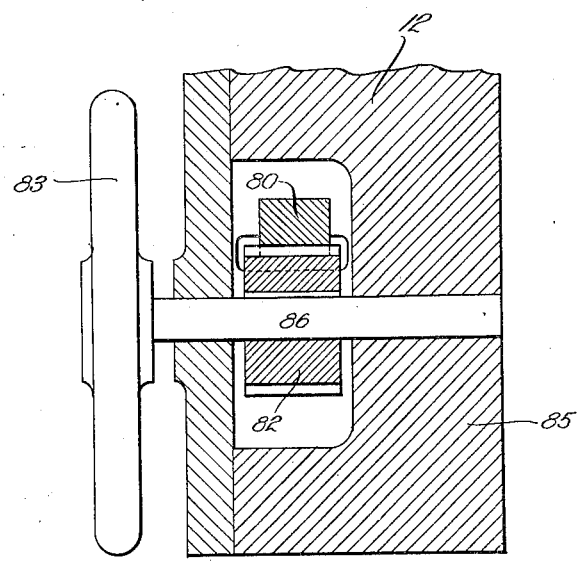
INVENTOR
HARRY F VICKERS
HIS ATTORNEY Patented Oct. 18, 1932

1,883,166

UNITED STATES PATENT OFFICE

HARRY F. VICKERS, OF DETROIT, MICHIGAN

MACHINE TOOL

Application filed May 19, 1930. Serial No. 453,846.

This invention relates to a machine tool and has particular reference to a machine such as a lathe, milling machine, or the like. It is a general object of this invention to provide an improved hydraulic feed or control means for the carriage of a lathe, or the like.

It is a general object of the present invention to provide a hydraulically operated lathe carriage under control of a manually operable member so that it can be operated conveniently and accurately in the same manner that a carriage is ordinarily operated through mechanical means.

A further object of this invention is to provide a simple, effective, and accurate hydraulic mechanism for controlling the carriage of a lathe, or the like. By the present invention the carriage of the lathe is under control of a manually or mechanically operable member so that it can be operated more accurately than is ordinarily possible with mechanical means such as are usually embodied in lathe constructions.

The various objects and features of the present invention will be best and more fully understood from the following detailed description of a typical form and application of the invention, throughout which description reference is had to the accompanying drawings, in which:

Fig. 1 is a front elevation of a typical lathe in which the carriage is operated hydraulically by the present invention. Fig. 2 is a plan view of the construction shown in Fig. 1, being a view taken as indicated by line 2—2 on Fig. 1, certain parts being broken away to illustrate details of the mechanism. Fig. 3 is an end view of the lathe with certain parts broken away to show details of construction. Fig. 4 is an enlarged longitudinal detailed sectional view of the valve means included in the hydraulic control. Fig. 5 is an enlarged detailed sectional view of the rack and pinion connection being a view taken longitudinally of the lathe, and Fig. 6 is an enlarged detailed sectional view taken on line 6—6 on Fig. 5.

The present invention is applicable, generally, to machine tools such as lathes, milling machines, and the like, where it is desired to feed or operate a carriage conveniently and accurately. The invention is particularly applicable to the standard or common type of lathe, and therefore I have shown a preferred embodiment of the invention applied to an ordinary lathe construction, it being understood that the broader principles of the invention are not to be thereby construed as limited or restricted.

The lathe illustrated in the drawings includes, a frame or longitudinal bed 10, a head 11 at one end of the bed, and a movable element or carriage 12 movable longitudinally on the bed. The bed 10 of the lathe may be provided with ways 13 slidably supporting the carriage 12. In accordance with standard lathe construction the carriage has an apron 14 extending downwardly at the front of the bed, which apron carries the various controls for the carriage. The present invention is primarily concerned with means for hydraulically operating the carriage longitudinally of the bed 10 and therefore I have eliminated from the drawings various other feeds or minor controls which are ordinarily provided in connection with a lathe carriage.

The present invention provides, generally, a cylinder and piston mechanism 20 operable to actuate the carriage 12 longitudinally on the ways 13 of the bed 10, a valve 21 for controlling the cylinder and piston mechanism, and manual control means 22 for the valve.

In the particular arrangement of parts illustrated in the drawings the cylinder of the mechanism 20 is fixed at the outer end of the bed 10 parallel with the ways 13 and the piston 24 of the mechanism is connected to a rod 25 which projects through the end of the cylinder and connects with the carriage 12. With this arrangement of parts operation of the piston 24 longitudinally in the cylinder 23 causes corresponding movement of the carriage longitudinally on the ways 13.

The valve 21 includes, generally, a body 35 and a valve proper 36 operable in the body. The valve is preferably of the piston type in which case the body 35 is in the nature of a cylinder having a bore 37 slidably carrying the valve 36. The valve 21 in the case illustrated is stationary with the bed 10 of the lathe; for instance, it may be located at the front of the lathe bed at the end where the cylinder and piston mechanism is located.

A fluid supply port 50 enters the middle portion of the body 35 and may be supplied with fluid under pressure from a motor driven pump 17, or the like, by a conduit 51.

A fluid outlet port 52 is provided at one end of the body and connects with a suitable conduit 53 provided for conducting fluid from the valve to the reservoir 19.

Cylinder ports 60 and 61 connect the bore 37 with the two ends of the cylinder 23 of the mechanism 20. The ports 60 and 61 communicate with the interior of the valve body at spaced points preferably at points located in opposite directions from the fluid inlet port 50. The valve 36 has a central opening extending into it from the end adjacent the outlet port 52 and has a recess or chamber 62 formed in its exterior to remain in communication with the fluid supply port 50. Chambers 60$^a$ and 61$^a$ are formed in the exterior of the valve at points spaced from the chamber 62 to cooperate with the ports 60 and 61, respectively. The chambers 62, 60$^a$ and 61$^a$ are in the nature of recesses formed around the valve 36 and are proportioned and located so that the valve has parts 60$^b$ and 61$^b$ located opposite the ports 60 and 61, respectively. The chambers 60$^a$ and 61$^a$ are in communication with the central opening in the valve and are therefore in communication with the outlet port 52. The valve parts above described are proportioned and related so that the valve 36 may be positioned in a central or neutral position where the parts 60$^b$ and 61$^b$ are related to the ports 60 and 61, respectively, so that fluid under pressure received through the port 50 enters the ports 60 and 61 equally and as fast as it enters the ports it escapes through the chambers 60$^a$ and 61$^a$ discharging into the central opening of the valve and hence through the outlet port 52. In Fig. 4 of the drawings the valve is illustrated in the neutral position where the fluid is thus by-passed around the parts 60$^b$ and 61$^b$ leaving the mechanism balanced with equal pressure at the two sides of the piston in the cylinder 20.

Movement of the valve 36 in either direction from the balanced or neutral position will immediately disturb the equilibrium or balanced condition under which the parts are all at rest and will cause more pressure to come at one side of the piston than the other with the result that the mechanism is operated by fluid pressure. For example, upon movement of the valve 36 in the direction indicated by the arrow in Fig. 4 the valve takes a position allowing a greater amount of fluid from the chamber 62 to enter the port 60 than the part 61 and allowing free exhaust of fluid through the port 61 to the outlet 62. With the valve thus positioned fluid under pressure enters one end of the cylinder 23 through the port 60, causing the piston to move through the cylinder as fluid escapes from the other end of the cylinder through the port 61. Upon return of the valve to the neutral position the flow of fluid to the cylinder 23 ceases so that the piston is held in the cylinder so that it cannot move in either direction. If the valve is moved in the opposite direction the flow is reversed from that just described with the result that the piston is moved in the opposite direction in the cylinder. It will be obvious that flow to the cylinder in either direction will continue only as long as the valve is in one direction or the other from the neutral position.

The control 22 provided by the present invention includes, generally, a rack 80 arranged longitudinally of the lathe bed 10 and connected with the stem 81 of the valve 36 and a pinion 82 carried by the carriage 12 to be operated by a hand wheel 83 at the front of the carriage.

The rack 80 extends longitudinally of the lathe bed parallel with the ways 13 and may be located at the front of the bed in the manner illustrated throughout the drawings. The rack is adapted to be moved longitudinally relative to the lathe bed in order to effect movement and therefore operation of the valve 36. In the case illustrated the rack is shown slidably supported by a guideway 85. The rack 80, being connected with the valve 36 through the stem 81, causes operation of the valve upon being shifted longitudinally of the lathe bed.

The pinion 82 is carried on a shaft 86, mounted in the apron 14 of the lathe carriage, so that it meshes with the rack 80. The shaft 86 projects from the front of the carriage where it carries the hand wheel 83. With this arrangement of parts turning of the hand wheel causes operation of the pinion which, being meshed with the rack 80, causes movement of the rack, the direction of movement of the rack depending upon the direction in which the hand wheel is operated. When the pinion 82 is turned by the operator engaging and moving the hand wheel 83 the rack 80 is operated to move the valve 36 out of the neutral position, fluid is admitted through the valve to one end of the cylinder and is allowed to escape freely from the other end of the cylinder 23, thus causing the piston 24 to be operated through the cylinder and causing the carriage to be moved longitudinally on the ways 13. When the operator stops moving the pinion and holds it against rotation the movement of the lathe carriage which supports the pinion causes the pinion to cooperate with the rack so that the rack is returned to the neutral position or to the position where the valve 36 is neutral, whereon operation of the mechanism immediately ceases. In practice this automatic stopping of operation upon stopping movement of the pinion 82 through the hand wheel 83 is almost instantaneous, it being necessary to provide only a few thousandths of an inch movement of the rack relative to the lathe bed in order to effect proper operation of the mechanism. It will be obvious how the direction of operation of the carriage depends upon the direction in which the rack 80 is operated by means of the pinion 82 and that the valve automatically returns to the neutral position upon the pinion stopping operation after having been operated in either direction. It will be obvious that the pinion may be operated automatically or mechanically employing principles of construction common to lathes and like machine tools. Therefore, when I use the term, operating member, I mean to include either a mechanically operated member or a manually operated member that may function to operate the control.

For the purpose of providing for continuous operation of the lathe carriage in either direction without operating through the hand wheel 83, for instance, for operating the carriage rapidly in one direction or the other, a hand lever 90 is pivotally connected to a stationary part of the lathe at 91 and is connected with the rack at a point 92 removed from the point 91. Through the lever 90 the rack may be moved in either direction independently of the hand wheel 83 and pinion 82 thus operating the valve 36 in either direction to cause the desired operation of the carriage 12.

From the foregoing description it will be apparent that the present invention provides a hydraulic operating means for a lathe carriage which is under control of a hand wheel so that the carriage operates only so long as the hand wheel is operated and is accurately responsive to operation of the hand wheel. The arrangement, whereby the movement of the carriage after movement of the hand wheel has ceased immediately operates the parts to the neutral position, is an important feature of the invention and overcomes an undesirable feature which has heretofore characterized hydraulic means for operating lathe carriages, and the like. For instance, in the ordinary hydraulic control for a lathe carriage, or the like, the carriage operates whenever the control lever is in position one way or the other from the neutral and does not cease operation until the lever is returned by the operator to the neutral position. It is also to be particularly noted that the present invention provides an extremely simple arrangement and combination of parts. The direct coupling of the rack and valve 36 is extremely simple and the parts required on the carriage, namely, the hand wheel 83, shaft 86, and pinion 82, are extremely simple both in construction and operation.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In a machine tool, a stationary frame, a movable carriage on the frame, fluid pressure actuated means for operating said carriage relative to the frame, and a control for said means including, a valve connected with a fluid supply and an outlet and with said means for operation in either direction, a rack slidably supported on the frame and operatively connected with the valve, and an actuating pinion carried by the carriage on a fixed axis and operatively engaging the rack.

2. In a machine tool, a stationary frame, a movable carriage on the frame, fluid pressure actuated means for operating said element, and a control for said means including, a valve connected with a fluid supply and an outlet and with said means for operation in either direction, a rack slidably supported on the frame for movement parallel with the carriage, a manually operable pinion carried by the carriage on a fixed axis and operatively engaging the rack, and a manually operable member carried by the frame for operating the rack independently of the pinion.

3. In a machine tool, a stationary frame, a movable carriage on the frame, fluid pressure actuated means for operating said carriage relative to the frame, and a control for said means including, a valve connected with a fluid supply and an outlet and with said means for operation in either direction, a rack slidably carried on the frame, a manually operable pinion carried by the carriage on a fixed axis and meshing with the rack, and a manually operable lever pivotally mounted on the frame and operatively connected with the rack independently of the pinion.

4. In a machine tool, a stationary frame, a movable carriage on the frame, a cylinder and piston mechanism for operating the carriage relative to the frame, a valve receiving a continuous supply of fluid and normally by-passing the fluid, the valve having openings connected with said mechanism for supplying and exhausting fluid for operating the mechanism, a rack extending parallel with the direction of movement of the carriage and directly operatively connected with the valve, a pinion for operating the rack carried by the carriage, and a manual operating member for the pinion carried by the carriage.

5. In a machine tool, a stationary frame, a carriage slidably mounted on the frame, a cylinder stationary on the frame, a piston operable in the cylinder and operatively connected with the carriage, a valve body stationary on the frame and connected with a fluid supply, with an exhaust, and with both ends of said cylinder, a valve operable in the body to control passage of fluid to and from the cylinder, a rack arranged parallel with the direction of movement of the carriage and directly connected with the valve, the rack being slidably supported by the carriage, a pinion carried by the carriage on a fixed axis and in engagement with the rack, a hand wheel for operating the pinion, and a lever pivotally mounted on the frame and operatively connected with the rack independently of the carriage and pinion.

6. In a machine tool, a stationary frame, a carriage movable on the frame, fluid pressure actuated means for operating the carriage relative to the frame, and a control for said means including a valve connected with a fluid supply and an outlet and with said means for operation in either direction, a rack supported on the frame for longitudinal movement and operatively connected with the valve, and an actuating pinion carried by the carriage on a fixed axis and operatively engaging the rack.

In witness that I claim the foregoing I have hereunto subscribed my name this 24th day of March, 1930.

HARRY F. VICKERS.